H. L. IDE.
PHOTOGRAPHIC CAMERA.
APPLICATION FILED NOV. 26, 1915.
1,208,321.
Patented Dec. 12, 1916.
2 SHEETS—SHEET 1.
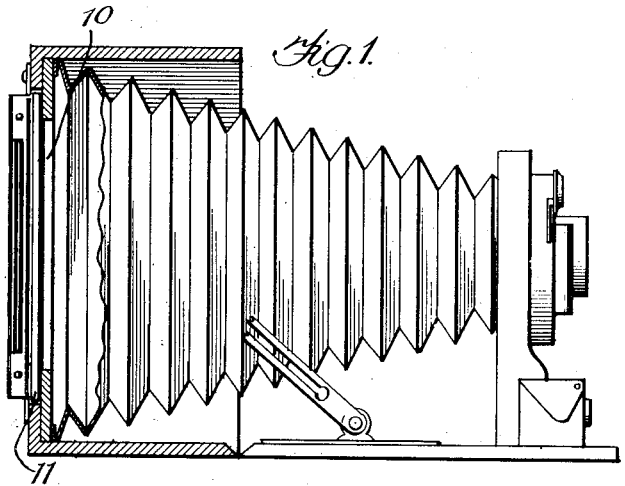
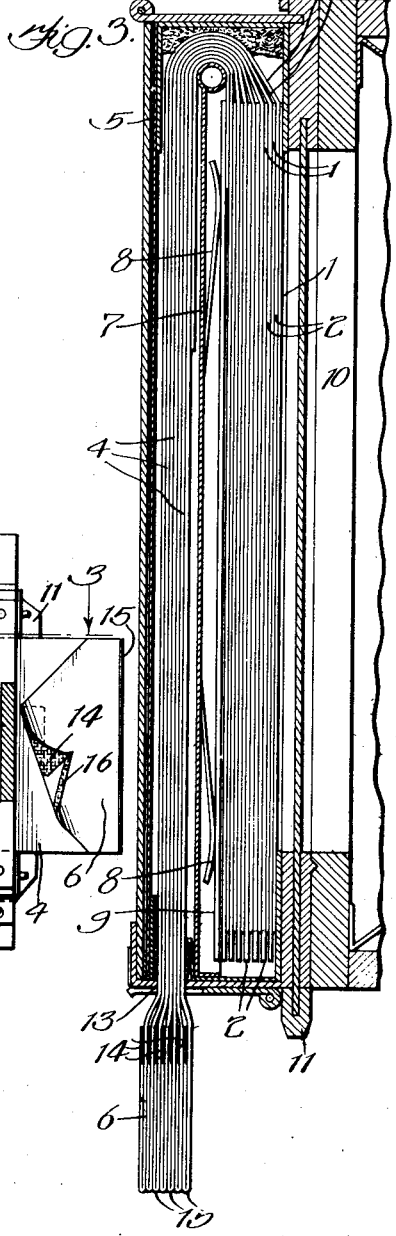
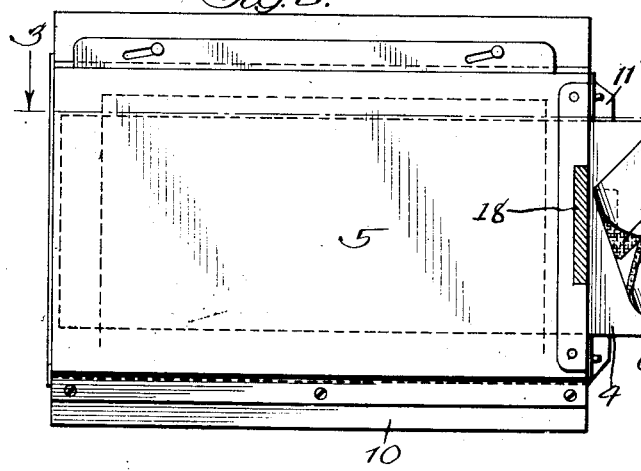
Inventor:
Harry L. Ide.
By G. L. Cragg Atty.

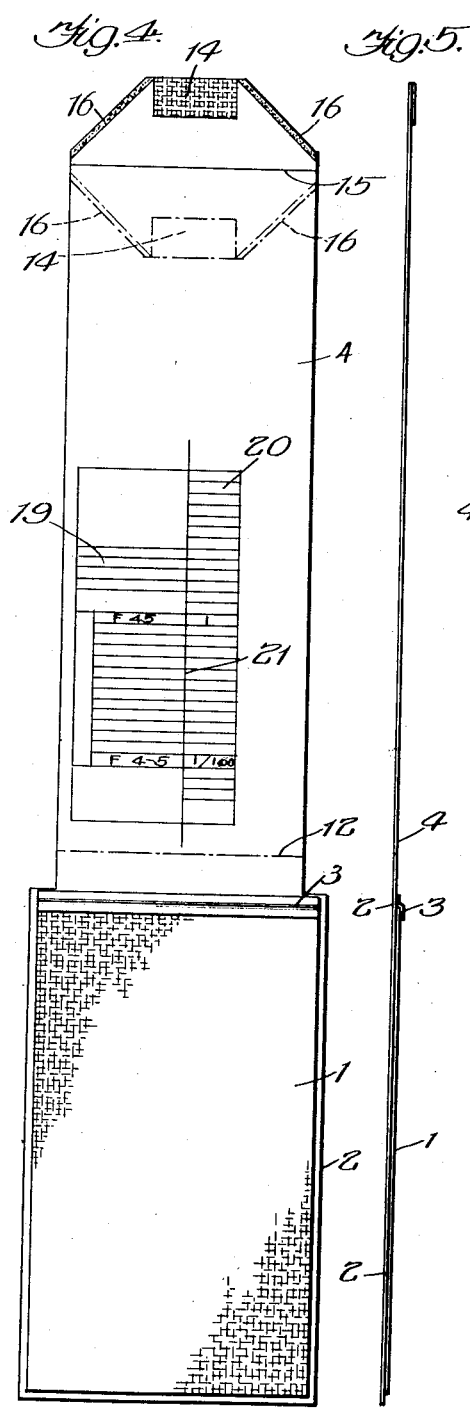
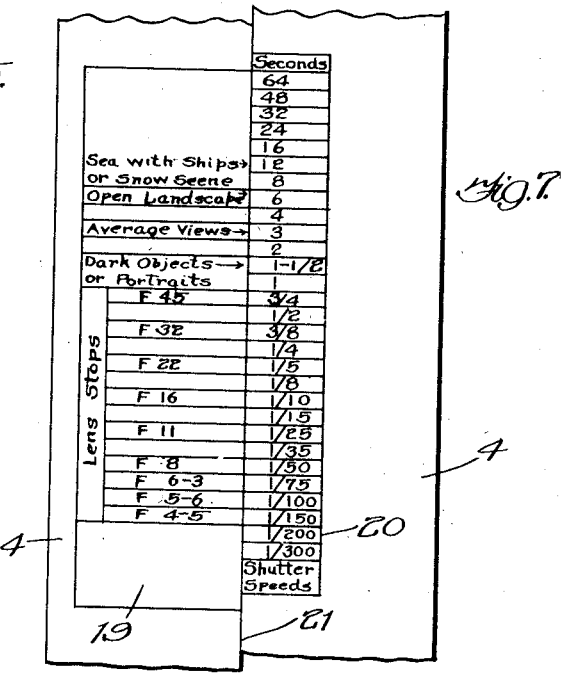
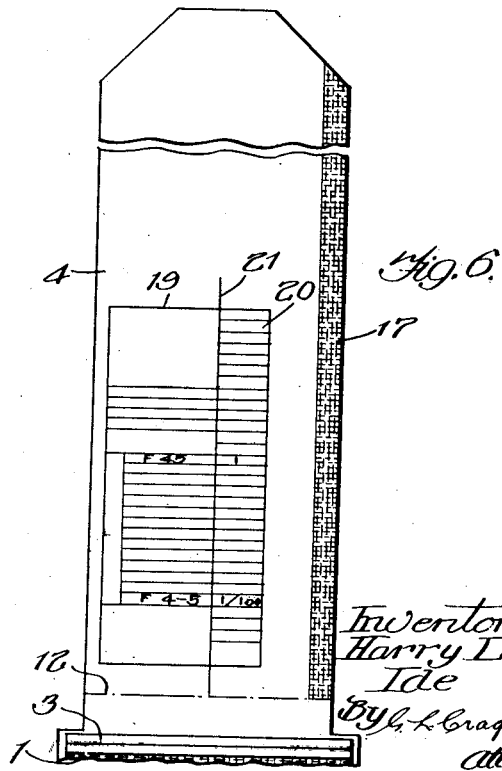

UNITED STATES PATENT OFFICE.

HARRY L. IDE, OF SPRINGFIELD, ILLINOIS, ASSIGNOR OF ONE-HALF TO ROY W. IDE, OF SPRINGFIELD, ILLINOIS.

PHOTOGRAPHIC CAMERA.

1,208,321.  Specification of Letters Patent.  Patented Dec. 12, 1916.

Application filed November 26, 1915.  Serial No. 63,399.

*To all whom it may concern:*

Be it known that I, HARRY L. IDE, citizen of the United States, residing at Springfield, in the county of Sangamon and State of Illinois, have invented a certain new and useful Improvement in Photographic Cameras, of which the following is a full, clear, concise, and exact description, reference being had to the accompanying drawings, forming a part of this specification.

My invention relates to photographic cameras and in some of its aspects constitutes a form of camera which is broadly covered by my co-pending application Serial No. 19,113, filed April 5, 1915. This portion of my invention relates to that class of cameras that employ film packs, there being a plurality of films each constituting a negative producing element and each provided with its light shielding cover or backing paper to protect its neighbor when in unexposed position within the camera casing, with the qualification that the first film of the series is protected by a safety cover that is not coupled with any film but which is to be pulled in order that the first film may be exposed, while the backing strip for the last film of the series protects this last film and other films as well from light that might enter the camera at other than the lens opening. These backing strips or light shields are, for the sake of uniformity, all provided with sensitized testing portions for measuring actinic light value, the safety cover also having such a sensitized portion. These sensitized portions are desirably provided upon tabs that constitute continuations of the backing strips or covers. Whenever a backing strip or cover is moved to expose the succeeding film or negative producing element the sensitized portion thereon is brought to a position in which it is exposed to the action of light or in which it may be adjusted to be so exposed to determine the duration to which the negative producing element newly uncovered within the camera is to be exposed. The time taken by the sensitized testing portion in changing its tint to a standard or master tint enables the user to determine the duration of exposure for the film or negative producing element and to this end there is employed an adjustable calculating device or table which guides the user in regulating the exposure.

In the preferred embodiment of the invention the tabs are of the same material of which the backing strips or light shields are made, each light shield having a tab that is integrally formed therewith. The sensitized testing portion may be pasted upon the backing paper of which the tabs and light shields are made but I prefer to sensitize this paper itself so that no additional paper need be applied thereto.

While I have employed sensitized backing paper in cameras of the film pack type I do not wish this feature of my invention to be limited to the sensitizing of backing paper or material in cameras of the film pack type.

In accordance with another feature of my invention each tab is provided with parts of a calculating table that are to be relatively adjusted by the camera user. Initially these parts of the calculating table are in fixed relation but after the tab is fully withdrawn from the camera casing these parts of the calculating table may be separated along a weakened line intervening between them to permit of their relative adjustment, it being understood that each tab is torn from the backing strip coupled therewith after the tab has been fully withdrawn from the camera casing.

I will explain my invention more fully by reference to the accompanying drawings in which—

Figure 1 is a view in elevation, partially in section, of a camera embracing the invention; Fig. 2 is a rear view of the camera; Fig. 3 is a view on line 3 3 of Fig. 2; Fig. 4 shows a film or negative producing element and its backing strip or light shield and the tab continuation of such shield; Fig. 5 is an edge view of the structure shown in Fig. 4; Fig. 6 illustrates a modification of the part of the arrangement illustrated in Fig. 4; and Fig. 7 shows the two parts of the calculating table in relatively adjustable relation.

Like parts are indicated by similar characters of reference throughout the different figures.

The sensitized elements that are to form the photographic negatives are preferably embodied in a plurality of films 1 each constituting a negative producing element. Each film is pasted at one end only to the light shield 2 by means of an adhesive strip 3. Each light shield 2 is extended at 4 to constitute a pulling tab. Each tab is normally mainly concealed within the camera casing 5, relatively small portions of the tabs projecting from the camera casing as illustrated at 6 in Fig. 3. The base portions of the tabs, those portions which are adjacent the negative producing elements or films, are passed over the curled end of a spring plate 7 as indicated in Fig. 3, this spring plate carrying spring fingers 8 that press upon a backing plate 9 that holds the negative elements 1 and their light shields 2, in compact relation in front of the exposure chamber 10 of the camera, the camera being provided with an opaque slide 11 for normally separating the portion of the camera casing containing the negative producing elements or films and the exposure chamber, this slide being drawn whenever a picture is to be taken. The printed line 12 upon each tab is the tearing line along which the tab is torn off whenever this line is brought into register with the opening 13 (margined by suitable light excluding material) through which the tabs extend.

In the form of the invention illustrated in Figs. 3, 4 and 5 each tab is provided with a sensitized testing portion 14 that is pasted on its outer end but which is normally protected from the light by having the outer end of the tab folded along the line 15, the outer end of the tab having edgings 16 of adhesive material which enable the outer end of the tab to be pasted down upon the balance of the tab so that the sensitized testing portion is concealed, the position occupied by the outer end of the tab when pasted down being indicated by dotted lines at the upper end of Fig. 4. I prefer, however, to employ the arrangement shown in Fig. 6 where a longitudinal edge of the backing paper, in this instance the longitudinal edge of the tab continuation of the backing paper, is itself sensitized as indicated at 17 in Fig. 6. For convenience of manufacture this sensitizing is continued throughout the length of the tab. While it may be true that the outer end of the testing portion 17 may become prematurely acted upon by the light unless the tab be folded over at its outer end, yet this would be immaterial since the user of the camera would be instructed to employ the portion of the sensitized part 17 nearer the cover or shield 2, this part of the sensitized surface of the tab being normally well within the camera casing so as to be protected until required.

In sensitizing the backing paper of which the light shields 2 are made, at 17, I desirably coat the portion 17 (this portion constituting a foundation for the sensitized surface) with an emulsion of silver bromid. This coating is thereafter treated with a solution of sodium nitrite or solution of potassium metabisulfite to cause the silver emulsion to turn to the standard tint when exposed to actinic light. Whether the sensitized testing portions are separably provided or are formed upon the backing paper they are to be used in conjunction with a standard tint such as that indicated at 18 in Fig. 2.

The sensitized testing portions are initially a definite shade of yellow, these testing portions, in changing tint, assuming the greenish tint which is the standard tint provided at 18. Before a new picture is taken either the safety cover or the light shield 2 coupled with the previously exposed film is drawn from in front of the film to be exposed by pulling upon the tab 4 belonging to the shield or cover that is to be removed, such tab being withdrawn until the line 12 registers with the opening 13 in the camera. When the tab is thus withdrawn the sensitized testing portion 14 or 17 (according to the form of the invention employed) is exposed to the action of actinic light, such sensitized portion being desirably closely approached to the standard tint 18, as indicated in Fig. 2, in the testing operation. The number of seconds or minutes required to bring the tint of the changeable tint sensitized area 14 or 17 to be the same shade as the tint defined by the master tint 18 measures the actinic light value and the duration of the picture taking exposure is governed according to this value thus determined in the testing operation and also according to the size of the lens aperture which is selected in the photographic operation as will be understood by those familiar with the art, there being devices upon the market which will guide the user in determining the duration of exposure with differing sizes of lens openings after the actinic light value has been determined.

In accordance with the remaining feature of my invention, each tab is provided with a calculating table which is printed or otherwise placed thereupon for convenience of the user. In the form of the invention shown the table includes one column 19 which embraces descriptions of the subjects most commonly photographed and a list of various lens stops, and another column 20 which embraces a list of exposure periods in seconds and second fractions. The subjects in the left hand column 19 may be modified and their number varied as desired and the time divisions in the right hand column 20 may be changed and altered in number to suit the convenience and needs of the users. In the form of table illustrated the two columns are to be relatively adjustable longitudinally of each other as will be well understood by those skilled in the art and in order that the user may conveniently use the table the line 21 which separates the columns 19 and 20 is weakened or entirely cut through so that when the tab is torn off along the line 12 the portions of the tab bearing the columns 19 and 20 may readily be separated to permit these columns to be relatively adjusted longitudinally of each other to determine the size of the lens opening and the duration of exposure.

By way of a specific example illustrated in Fig. 7, let it be assumed that it took six seconds to turn the testing portion 14 or 17 to the shade of the master tint 18 and that the subject to be photographed is an open landscape. The title of the subject "Open Landscape" is placed in register with the figure 6 in column 20. The user will exercise his own judgment in selecting the stop, the stops being listed below the subjects in column 19. Assuming that it is stop "F 11" the exposure would be one-twenty-fifth of a second since "F 11" in column 19 registers with "1/25" in column 20.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. A photographic camera of the film pack type including negative producing elements arranged in a pack each of these elements having a sensitized portion coupled therewith for testing actinic light value.

2. A photographic camera of the film pack type including negative producing elements; and light shields therefor provided with sensitized portions for testing actinic light value.

3. A photographic camera of the film pack type including negative producing elements; and light shields therefor provided with pulling tabs which in turn are provided with sensitized portions for testing actinic light value.

In witness whereof, I hereunto subscribe my name this twenty-fourth day of November A. D., 1915.

HARRY L. IDE.

Witnesses:
  G. L. CRAGG,
  ETTA L. WHITE.